(12) United States Patent
Jeon et al.

(10) Patent No.: US 8,928,627 B2
(45) Date of Patent: Jan. 6, 2015

(54) LIGHT SENSING CIRCUIT, METHOD OF MANUFACTURING THE SAME, AND OPTICAL TOUCH PANEL INCLUDING THE LIGHT SENSING CIRCUIT

(75) Inventors: Sang-hun Jeon, Yongin-si (KR); I-hun Song, Seongnam-si (KR); Seung-eon Ahn, Hwaseong-si (KR); Chang-jung Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 537 days.

(21) Appl. No.: 13/165,194

(22) Filed: Jun. 21, 2011

(65) Prior Publication Data

US 2012/0139876 A1    Jun. 7, 2012

(30) Foreign Application Priority Data

Dec. 6, 2010    (KR) .................. 10-2010-0123479

(51) Int. Cl.
*G06F 3/042* (2006.01)
*G06F 3/041* (2006.01)
*G06F 3/038* (2013.01)

(52) U.S. Cl.
CPC .... *G06F 3/0412* (2013.01); *G06F 2203/04103* (2013.01); *G06F 3/042* (2013.01); *G06F 3/0386* (2013.01)
USPC ........... 345/175; 345/173; 345/174; 345/207; 345/81; 345/104; 345/179; 345/182; 345/183; 345/204; 345/205; 345/206; 178/18.01; 178/18.02; 178/18.03; 178/18.09; 178/20.01; 178/20.02; 178/20.03; 349/116

(58) Field of Classification Search
USPC ........... 345/173–175, 81, 104, 179, 182–183, 345/204–207; 257/43, E31.002; 438/57; 178/18.01–18.03, 18.09, 20.01–20.03; 349/116

See application file for complete search history.

(56) References Cited

U.S. PATENT DOCUMENTS

| | | | |
|---|---|---|---|
| 2002/0000915 A1* | 1/2002 | Lee et al. ...................... | 340/540 |
| 2005/0117079 A1* | 6/2005 | Pak et al. ......................... | 349/43 |
| 2007/0046650 A1* | 3/2007 | Lee et al. ...................... | 345/173 |
| 2007/0131936 A1* | 6/2007 | Kang et al. ..................... | 257/72 |
| 2007/0290971 A1* | 12/2007 | Shih et al. ...................... | 345/90 |
| 2009/0101900 A1* | 4/2009 | Chuang et al. ................. | 257/59 |
| 2009/0239335 A1* | 9/2009 | Akimoto et al. ............. | 438/104 |
| 2011/0284722 A1* | 11/2011 | Ahn et al. .................. | 250/208.1 |

FOREIGN PATENT DOCUMENTS

KR    10-2010-0042587    5/2010

\* cited by examiner

*Primary Examiner* — Olga Merkoulova
(74) *Attorney, Agent, or Firm* — Harness, Dickey & Pierce, P.L.C.

(57) ABSTRACT

A light sensing circuit using an oxide semiconductor transistor, a method of manufacturing the light sensing circuit, and an optical touch panel including the light sensing circuit. Because the light sensing circuit includes only one light sensor transistor and one switch transistor formed on the same substrate, a structure of the light sensing circuit is simplified. Furthermore, because the light sensor transistor and the switch transistor have the same structure, a method of manufacturing the light sensing circuit is also simplified. Also, since an optical touch panel or an image acquisition apparatus using the light sensing circuit uses the light sensing circuit having a simple structure and does not use a capacitor, the optical touch panel or the image acquisition apparatus may be made thinner and larger.

23 Claims, 8 Drawing Sheets

LIGHT SENSING CIRCUIT, METHOD OF MANUFACTURING THE SAME, AND OPTICAL TOUCH PANEL INCLUDING THE LIGHT SENSING CIRCUIT

CROSS-REFERENCE TO RELATED APPLICATIONS

This application claims priority under 35 U.S.C. §119 to Korean Patent Application No. 10-2010-0123479, filed on Dec. 6, 2010, in the Korean Intellectual Property Office (KIPO), the disclosure of which is incorporated herein in its entirety by reference.

BACKGROUND

1. Field

Example embodiments relate to a light sensing circuit, a method of manufacturing the same, and an optical touch panel including the light sensing circuit, and more particularly, to a light sensing circuit using an oxide semiconductor transistor, a method of manufacturing the light sensing circuit, and an optical touch panel including the light sensing circuit.

2. Description of the Related Art

Touch screens refer to apparatuses that allow input data to be directly input on a display screen in such a way that when, for example, a person's finger or a pen or something similar is brought into contact with a particular position on the display screen, the contact position is identified, and then a corresponding process is performed by software. To do this, touch screens further include a touch panel that is attached to a general display panel to perform the function described above. Examples of touch panels include resistive overlay touch panels, capacitive overlay touch panels, surface acoustic wave (SAW) touch panels, infrared touch panels, and piezoelectric touch panels. From among these, resistive overlay touch panels are the most popular. As technology advances, touch panels have been realized using various methods and as their prices have decreased, touch panels have become more commonly used. Recently, in-cell touch panels in which a touch sensor is integrated in a pixel of a display panel have been developed.

However, currently used touch panels operate only when a person's finger or a pen is brought into direct contact with the touch panels. Accordingly, when resistive overlay touch panels, which are the most widely used type of touch panel, are used, an upper or lower conductive layer may be damaged due to an external pressure. Moreover, although resistive overlay touch panels have an excellent sensing effect, they can be used only when a distance between the resistive overlay touch panels and a user is small. Thus, touch panels are used in a small or medium-sized display of, for example, a general desktop computer, a notebook computer, or a portable device, for example, a mobile phone or a navigation device. However, as display devices get larger, it may be difficult to use existing touch panels when a distance between a user and a display is large.

Recently, optical touch panels that may perform the same function as touch panels by sensing light have been introduced. In order to realize an optical touch panel, a light sensing circuit for sensing light is required. The light sensing circuit generally includes a light sensing element, and a switch circuit for outputting data from the light sensing element. For example, a photodiode basically having a PN junction of semiconductors, for example, silicon, is used as the light sensing element. However, since a photocurrent of a silicon photodiode is not large, the switch circuit requires a capacitor for accumulating charges for a predetermined period of time. Accordingly, the light sensing circuit increases in complexity and size and a parasitic capacitance is also increased, thereby making it difficult to manufacture large optical touch panels.

SUMMARY

Provided is a light sensing circuit having a structure that is simplified by using an oxide semiconductor transistor as a light sensing element. Provided also is a method of manufacturing a light sensing circuit which includes a substrate on which both an oxide semiconductor transistor for sensing light and a switch transistor for outputting data is formed. Provided also is an optical touch panel and an image acquisition apparatus using the light sensing circuit.

Additional aspects will be set forth in part in the description which follows and, in part, will be apparent from the description, or may be learned by practice of example embodiments.

In accordance with example embodiments, a light sensing circuit may include a substrate, a light sensor transistor on the substrate, the light sensor transistor being configured to sense light, a switch transistor on the substrate, the switch transistor being configured to output data from the light sensor transistor, and a light shielding film on a light incident surface of the switch transistor, the light shielding film being configured to substantially block light from being incident on the switch transistor.

In accordance with example embodiments, a method of manufacturing a light sensing circuit may include forming first and second gate electrodes on a substrate, forming a gate insulating film on the substrate and the first and second gate electrodes, forming first and second channel films on the gate insulating film to respectively face the first and second gate electrodes, forming source/drain electrodes on both sides of the first channel film and both sides of the second channel film, forming a transparent insulating film on the source/drain electrodes and the first and second channel films, and forming a light shielding film on the transparent insulating film to cover the second channel film. In example embodiments, the first and second channel films may be formed of a same oxide semiconductor material.

In accordance with example embodiments, a light sensing circuit may includes a substrate, a light sensor transistor that is disposed on the substrate and senses light, a switch transistor that is disposed on the substrate and outputs data from the light sensor transistor, and a light shielding film that is disposed on a light incident surface of the switch transistor in order to prevent or reduce light from being incident on the switch transistor.

Each of the light sensor transistor and the switch transistor may use an oxide semiconductor material for a channel film.

The oxide semiconductor materials used by the light sensor transistor and the switch transistor may be the same.

The oxide semiconductor material may be an oxide semiconductor material including ZnO, InO, SnO, InZnO, ZnSnO, or InSnO, or an oxide semiconductor material including at least one of hafnium (Hf), zirconium (Zr), titanium (Ti), tantalum (Ta), gallium (Ga), niobium (Nb), vanadium (V), aluminum (Al), gallium (Ga), and tin (Sn) in addition to ZnO, InO, SnO, InZnO, ZnSnO, or InSnO.

Each of the light sensor transistor and the switch transistor may include gate electrodes that are located on the substrate, a gate insulating film that is located to cover the substrate and the gate electrode, channel films that are partially located on the gate insulating film to face the gate electrodes and are each formed of an oxide semiconductor material, source/drain electrodes that are located on both sides of the channel films, and a transparent insulating layer that is located to cover the source/drain electrodes and the channel films.

A source electrode of the light sensor transistor and a drain electrode of the switch transistor may be connected.

The light sensor transistor may further include a first wire that passes through the transparent insulating film to be connected to a drain electrode, and the switch transistor may further include a second wire that passes through the transparent insulating layer to be connected to a source electrode.

The light sensing circuit may further include a driving voltage line that is connected to the drain electrode of the light sensor transistor through the first wire, and a data line that is connected to the source electrode of the switch transistor through the second wire.

The light shielding film may be located on the transparent insulating film to cover the channel film of the switch transistor.

Each of the channel films may have a 3-layer structure including a lower channel film, a central channel film disposed on the lower channel film, and an upper channel film disposed on the central channel film.

The central channel film may include ZnO, InO, SnO, InZnO, ZnSnO, or InSnO, the lower channel film may include XZnO, XInO, XSnO, XInZnO, XZnSnO, or XInSnO (where X is at least one of Hf, Zr, Ti, Ta, Ga, Nb, V, Al, Ga, and Sn), and the upper channel film may include MZnO, MInO, MSnO, MInZnO, MZnSnO, or MInSnO (where M is at least one of Hf, Zr, Ti, Ta, Ga, Nb, V, Al, Ga, and Sn).

The light shielding film may be grounded.

The light shielding film may be formed of a metal material that is thicker than a skin depth.

In accordance with example embodiments, a method of manufacturing a light sensing circuit may includes forming first and second gate electrodes on a substrate, entirely forming a gate insulating film on the substrate and the first and second gate electrodes, forming first and second channel films on the gate insulating film to respectively face the first and second gate electrodes, entirely forming source/drain electrodes on both sides of the first channel film and both sides of the second channel film, forming a transparent insulating film on the source/drain electrode and the first and second channel films, and partially forming a light shielding film on the transparent insulating layer to cover the second channel film.

The first and second channel films may be formed of the same oxide semiconductor material.

The source/drain electrodes may include a first source/drain electrode that is formed to cover a first side surface of the first channel film, a second source/drain electrode that is formed to cover a second side surface of the first channel film, a first side surface of the second channel film, and a portion of a gate insulating film between the first channel film and the second channel film, and a third source/drain electrode that is formed to cover a second side surface of the second channel film.

The method may further include, forming a first via hole by etching the transparent insulating layer to partially expose the first source/drain electrode, forming a second via hole by etching the transparent insulating layer to partially expose the third source/drain electrode, and forming a first wire electrically connected to the first source/drain electrode, and a second wire electrically connected to the third source/drain electrode, by filling the first and second via holes, respectively.

The light shielding film and the first and second wires may be simultaneously formed and may be formed of the same material.

The forming of the first and second channel films may include forming first and second lower channel films on the gate insulating film to respectively face the first and second gate electrodes, respectively forming first and second central channel films on the first and second lower channel films, and respectively forming first and second upper channel films on the first and second central channel films.

Each of the first and second central channel films may include ZnO, InO, SnO, InZnO, ZnSnO, or InSnO, each of the first and second lower channel films may include XZnO, XInO, XSnO, XInZnO, XZnSnO, or XInSnO (where X is at least one of Hf, Zr, Ti, Ta, Ga, Nb, V, Al, Ga, and Sn), and each of the first and second upper channel films may include MZnO, MInO, MSnO, MInZnO, MZnSnO, or MInSnO (where M is at least one of Hf, Zr, Ti, Ta, Ga, Nb, V, Al, Ga, and Sn).

In accordance with example embodiments, an optical touch panel may include a plurality of the light sensing circuits.

In accordance with example embodiments, an optical touch screen system may includes a display device that displays an image, the optical touch panel that is attached to a surface of the display panel, and a light source device that provides an optical signal to be emitted bathe optical touch panel.

In accordance with example embodiments, an image acquisition apparatus may include a plurality of the light sensing circuits.

In accordance with example embodiments, an in-cell type optical touch panel may includes a display pixel unit, and the light sensing circuit, wherein the display pixel unit and the light sensing circuit are integrated in one pixel.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments will now be described more fully with reference to the accompanying drawings, in which example embodiments are shown. In the drawings, the same reference numerals denote the same elements, and sizes of elements may be exaggerated for clarity and convenience.

An oxide semiconductor transistor is a transistor that uses an oxide semiconductor material as a channel material. From among oxide semiconductor materials, there are materials that are very sensitive to light. If an oxide semiconductor material that is sensitive to light is used as a channel material of a transistor, a light-sensitive transistor capable of sensing light may be manufactured. For example, an oxide semiconductor material used as a channel material may be an oxide semiconductor material such as ZnO, InO, SnO, InZnO, ZnSnO, or InSnO, or an oxide semiconductor material including at least one of hafnium (Hf), zirconium (Zr), titanium (Ti), tantalum (Ta), gallium (Ga), niobium (Nb), vanadium (V), aluminum (Al), gallium (Ga), and tin (Sn) in addition to ZnO, InO, SnO, InZnO, ZnSnO, or InSnO. Since a threshold voltage of an oxide semiconductor transistor using such a channel material varies according to a wavelength or intensity of incident light, the oxide semiconductor transistor may be used as a light sensor. For example, if light is applied to an oxide semiconductor transistor, a threshold voltage is shifted to a more negative value, and a drain current is increased. In an oxide semiconductor transistor, since a current ratio of a drain current when no light is applied (dark state) to a drain current when light is applied (light state) may be very high, the oxide semiconductor transistor may be used as a light sensor having a relatively high sensitivity. In particular, a current ratio is the highest around a dark state threshold voltage. Also, since an oxide semiconductor transistor may be formed as a thin film transistor (TFT), the oxide semiconductor transistor may be applied to an in-cell type optical touch panel in which an optical touch sensor is integrally formed in a display pixel.

Figure 1:
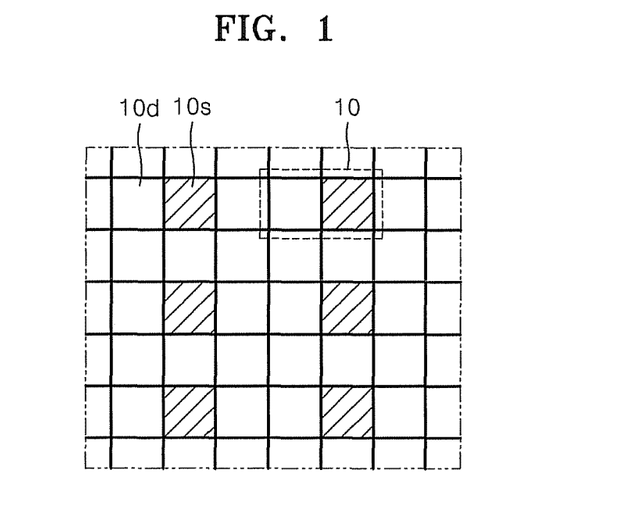
FIG. 1 illustrates pixels of an in-cell type optical touch panel in which a display pixel unit and a light sensing circuit unit are integrated.

For example, FIG. 1 illustrates pixels of an in-cell type optical touch panel in which a display pixel and an optical touch sensor are integrated. Referring to FIG. 1, a plurality of pixels 10 may be arranged in a two-dimensional (2D) array in the in-cell type optical touch panel. In at least some of the plurality of pixels 10, both a display pixel unit 10d for displaying an image and a light sensing circuit unit 10s for sensing incident light may be formed. According to example embodiments, the display pixel unit 10d and the light sensing circuit unit 10s may be individually located in all of the pixels 10. However, in order to increase display resolution, the light sensing circuit unit 10s may be located in only some of the pixels 10. In general, since a spot size of light emitted to the in-cell type optical touch panel for the purpose of optical touch control is larger than one of the pixels 10, it is possible to relatively and precisely specify a position on which light is incident even though the light sensing circuit unit 10s is located in only some of the pixels 10 as shown in FIG. 2.

Figure 2:
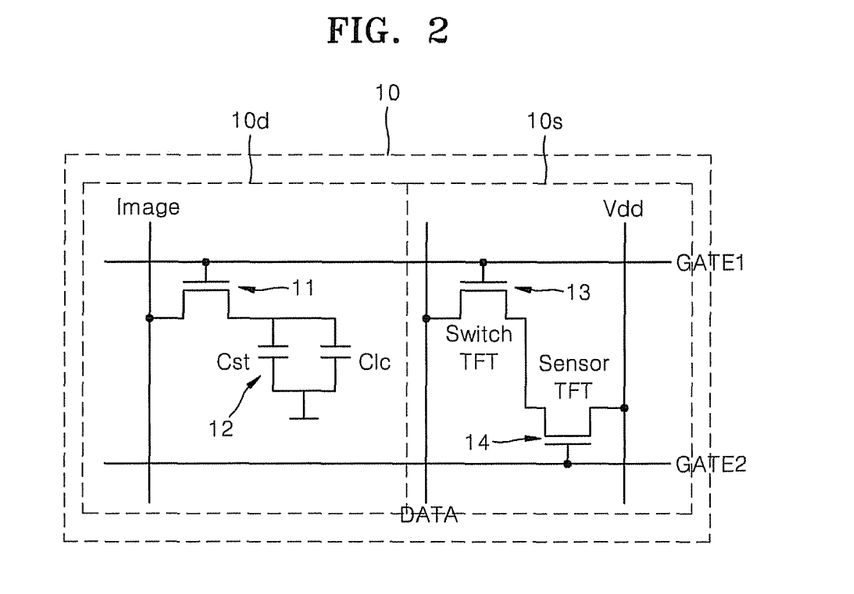
FIG. 2 is a circuit diagram illustrating a circuit structure of one of the pixels of the in-cell type optical touch panel of FIG. 1 in which the display pixel unit and the light sensing circuit unit are integrated.

FIG. 2 is a circuit diagram illustrating a circuit structure of one of the pixels 10 of the in-cell type optical touch panel of FIG. 1 in which the display pixel unit 10d and the light sensing circuit 10s are integrated. Referring to FIG. 2, the display pixel unit 10d may include a liquid crystal cell 12, and a first switch TFT 11 for turning on or off the liquid crystal cell 12. Also, the light sensing circuit unit 10s may include a light sensor TFT 14 for sensing incident light, and a second switch TFT for outputting data from the light sensor TFT 14. In example embodiments, the light sensor TFT 14 and the second switch TFT 13 may be connected in series. In example embodiments, gates of the first and second switch TFTs 11 and 13 may be connected to a first gate line GATE1. A drain of the first switch TFT 11 may be connected to an image signal line Image, and a source of the first switch TFT 11 may be connected to the liquid crystal cell 12. Also, a source of the second switch TFT 13 may be connected to a data line DATA, and a drain of the second switch TFT 13 may be connected to a source of the light sensor TFT 14. Furthermore, a gate of the light sensor TFT 14 may be connected to a second gate line GATE2, and a drain of the light sensor TFT 14 may be connected to a driving voltage line Vdd.

In example embodiments, the second switch TFT 13 of the light sensing circuit unit 10s may have constant electric characteristics irrespective of whether light is applied whereas a drain current of the light sensor TFT 14 may greatly vary according to whether light is applied. To this end, a material not sensitive to light may be used as a channel material of the second switch TFT 13, and material sensitive to light, for example an oxide semiconductor material, may be used as a channel material of the light sensor TFT 14. However, if a channel material of the second switch TFT 13 and a channel material for the light sensor TFT 14 are different from each other, a process for manufacturing the second switch TFT 13 and the light sensor TFT 14 on one substrate at once may be relatively complicated. Accordingly, this disclosure provides a relatively efficient manufacturing method for forming both the second switch TFT 13 and the light sensor TFT 14 of the light sensing circuit unit 10s on the same substrate.

FIGS. 3A through 3G are cross-sectional views illustrating a method of forming both the switch TFT 13 and the light sensor TFT 14 of the light sensing circuit unit 10s on the same substrate, according to example embodiments. Since the following explanation is focused on forming both the switch TFT 13 and the light sensor TFT 14 on one substrate, a process of forming other elements of the light sensing circuit unit 10s will not be explained.

Figure 3A:
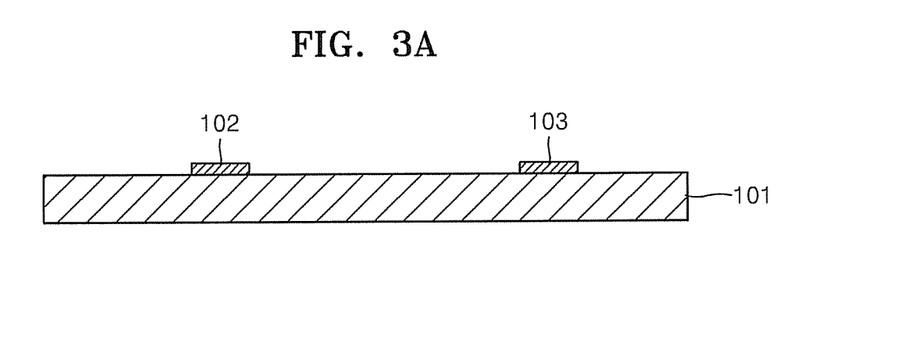
FIGS. 3A through 3G are cross-sectional views illustrating a method of manufacturing the light sensing circuit unit, according to example embodiments.

Referring to FIG. 3A, a first gate electrode 102 and a second gate electrode 103 may be formed on a substrate 101. In example embodiments, the first gate electrode 102 on the left of FIG. 3A may become a gate electrode of the light sensor TFT 14, and the second gate electrode 103 on the right of FIG. 3A may become a gate electrode of the switch TFT 13. Each of the first and second gate electrodes 102 and 103 may be formed of, for example, a conductive metal or a conductive metal oxide. In order to form the first and second gate electrodes 102 and 103 on the substrate 101, a conductive metal or a conductive metal oxide material may be entirely deposited on a top surface of the substrate 101. In example embodiments, regions of the conductive metal or the conductive metal oxide material other than regions in which the first and second gate electrodes 102 and 103 are to be formed may be removed by using etching.

Figure 3B:
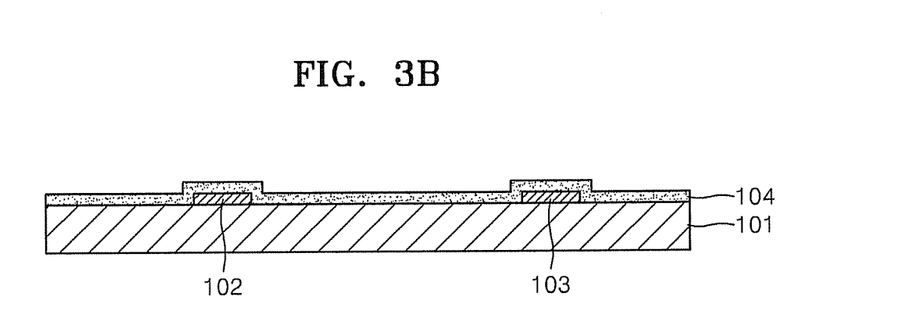

Referring to FIG. 3B, a gate insulating film 104 may be applied on the substrate 101 and the first and second gate electrodes 102 and 103. The gate insulating film 104, for example, may be applied to entirely cover the substrate and the first and second gate electrodes 102 and 103. In example embodiments, a thickness of the gate insulating film 104 may be predetermined. The gate insulating film 104 may be formed of a semiconductor oxide material such as $SiO_2$.

Figure 3C:
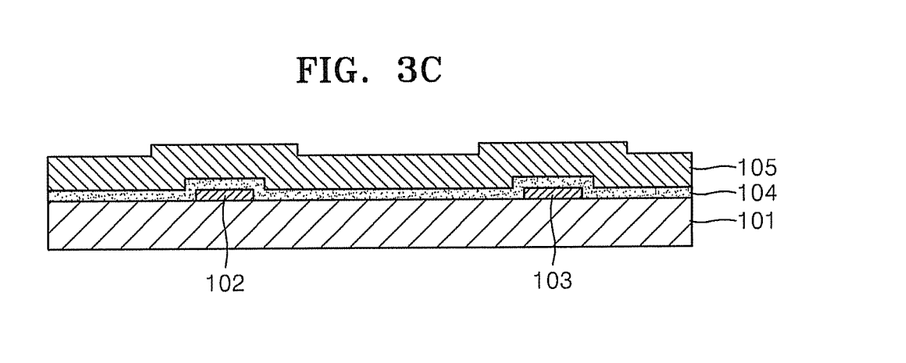
Figure 3D:
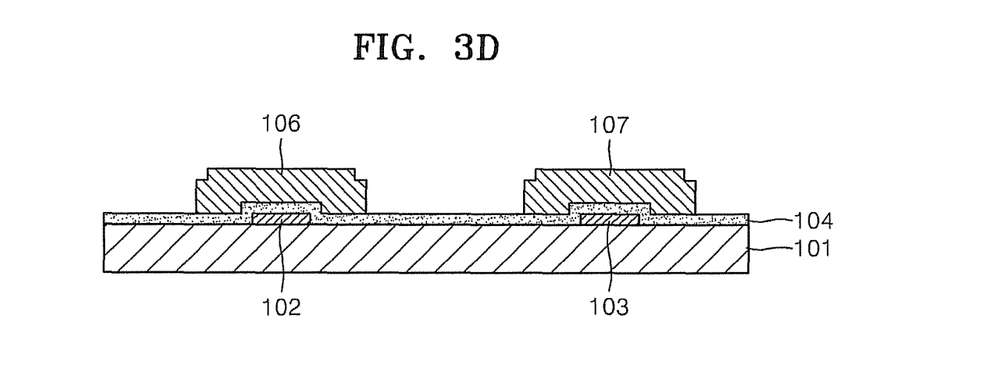

Referring to FIGS. 3C and 3D, a first channel film 106 may be formed on the gate insulating film 104 to face the first gate electrode 102, and at the same time, a second channel film 107 may be formed on the gate insulating film 104 to face the second gate electrode 103. For example, as shown in FIG. 3C, a channel material layer 105 may be applied on the gate insulating film 104. In example embodiments, the channel material layer 105 may be formed to have a predetermined thickness and may be formed to entirely cover the gate insulating film. As described above, the channel material layer 105 may be formed of an oxide semiconductor material sensitive to light, for example, ZnO, InO, SnO, InZnO, ZnSnO, or InSnO, or an oxide semiconductor material including at least one of Hf, Zr, Ti, Ta, Ga, Nb, V, Al, Ga, and Sn in addition to ZnO, InO, SnO, InZnO, ZnSnO, or InSnO.

Referring to FIG. 3D, regions of the channel material layer 105 other than regions in which the first and second channel films 106 and 107 are to be formed may be removed by using etching. The first channel film 106 may become a channel of the light sensor TFT 14, and the second channel film 107 may become a channel of the switch TFT 13.

Figure 3E:
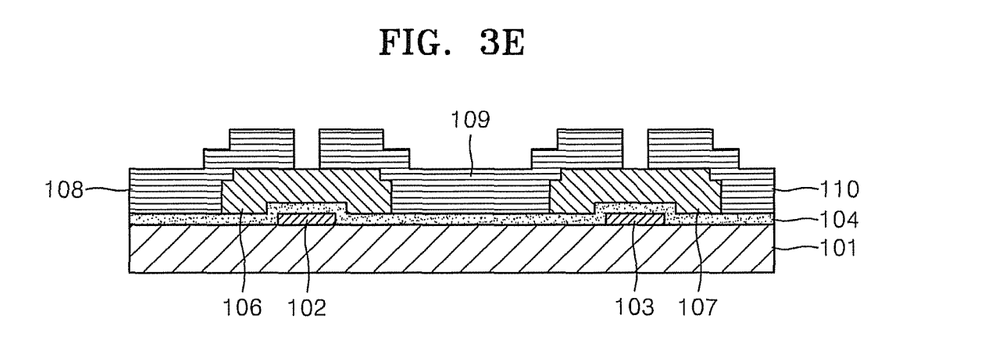

Referring to FIG. 3E, the source/drain electrodes 108, 109, and 110 may be formed on both sides of the first channel film 106 and the second channel film 107. For example, the first source/drain electrode 108 may be formed to cover a left side surface of the first channel film 106 and a left side surface of the gate insulating film 104 not covered by the first channel film 106. The second source/drain electrode 109 may be formed to cover a right side surface of the first channel film 106, a left side surface of the second channel film 107, and a portion of the gate insulating film 104 between the first channel film 106 and the second channel film 107. The third source/drain electrode 110 may be formed to cover a right side surface of the second channel film 107 and a right side surface of the gate insulating film 104 not covered by the second channel film 107. The first source/drain electrode 108 may act as, for example, a drain electrode of the light sensor TFT 14. The second source/drain electrode 109 may act as both a source electrode of the light sensor TFT 14 and a drain electrode of the switch TFT 13. In other words, the source electrode of the light sensor TFT 14 and the drain electrode of the switch TFT 13 may be connected with one source/drain electrode 109. The third source/drain electrode 110 may act as a source electrode of the switch TFT 13. The first through third source/drain electrodes 108, 109, and 110 may be formed by entirely depositing, for example, a conductive metal or a conductive metal oxide, on the gate insulating film 104 and the first and second channel films 106 and 107 and then partially removing the conductive metal or the conductive metal oxide remaining on central portions of top surfaces of the first and second channel films 106 and 107. Accordingly, the central portions of the top surfaces of the first and second channel films 106 and 107 may be exposed without being covered by the first through third source/drain electrodes 108, 109, and 110.

Figure 3F:
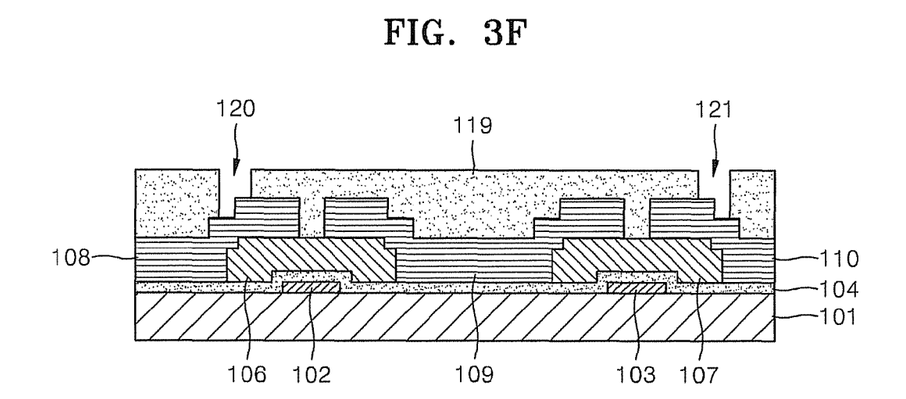

Referring to FIG. 3F, a transparent insulating layer 119 may be on the first through third source/drain electrodes 108, 109, and 110 and the first and second channel films 106 and 107. In example embodiments, the transparent insulating layer 119 may be entirely formed to a predetermined thickness. The transparent insulating layer 119 may be formed of a transparent insulating material through which light may be incident on the first channel film 106. For example, the transparent insulating layer 119 may be formed of $SiO_2$.

Referring to FIG. 3F, a first via hole 120 may be formed by etching the transparent insulating layer 119 to partially expose the first source/drain electrode 108. At the same time, a second via hole 121 may be formed by etching the transparent insulating layer 119 to partially expose the third source/drain electrode 110.

Figure 3G:
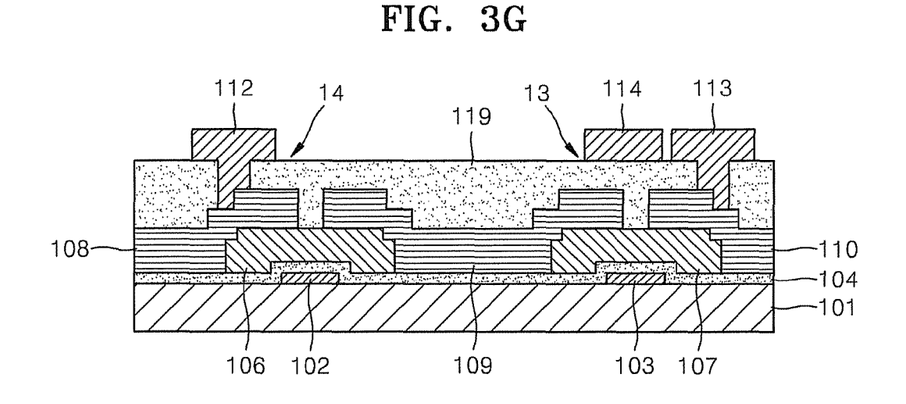

Referring to FIG. 3G, wires 112 and 113 may be formed by filling a conductive metal or a conductive metal oxide material in the first and second via holes 120 and 121. At the same time, a light shielding film 114 may be partially formed on a region of the switch TFT 13 on the transparent insulating layer 119. Accordingly, the first wire 112 may pass through the transparent insulating layer 119 to be electrically connected to the first source/drain electrode 108, and the second wire 113 may pass through the transparent insulating layer 119 to be electrically connected to the second source/drain electrode 110. The wires 112 and 113 and the light shielding film 114 may be simultaneously formed, and may be formed of the same material. The light shielding film 114 may be disposed on a light incident surface of the switch TFT 13 to cover the second channel film 107, so that the light shielding film 114 prevents or reduces light from being incident on the second channel film 107. To this end, the light shielding film 114 may be formed so as not to allow light to be transmitted therethrough. In the alternative, the light shielding film 114 may be formed so that relatively little light is transmitted therethrough. For example, if the light shielding film 114 is formed of a metal like the wires 112 and 113, a thickness of the light shielding film 114 may be greater than a skin depth of the metal. In example embodiments, the first wire 112 may be connected to the driving voltage line Vdd of FIG. 2, and the second wire 113 may be connected to the data line DATA of FIG. 2.

The switch TFT 13 and the light sensor TFT 14 of the light sensing circuit unit 10s may be simply formed on one substrate 101 in the above-described method. In particular, according to the method of FIGS. 3A through 3G, since the switch TFT 13 and the light sensor TFT 14 may have the same structure, a manufacturing process may be greatly simplified. Also, the switch TFT 13 may be rarely affected by light because the switch TFT 13 may be completely covered by the light shielding film 114. Furthermore, since the light shielding film 114 may be formed along with the wires 112 and 113 in a general wire forming process, an additional process for forming the light shielding film 114 is not required. Therefore, according to example embodiments, the light sensing circuit unit 10s may be very simply formed without any additional process to an existing semiconductor process.

Figure 4A:
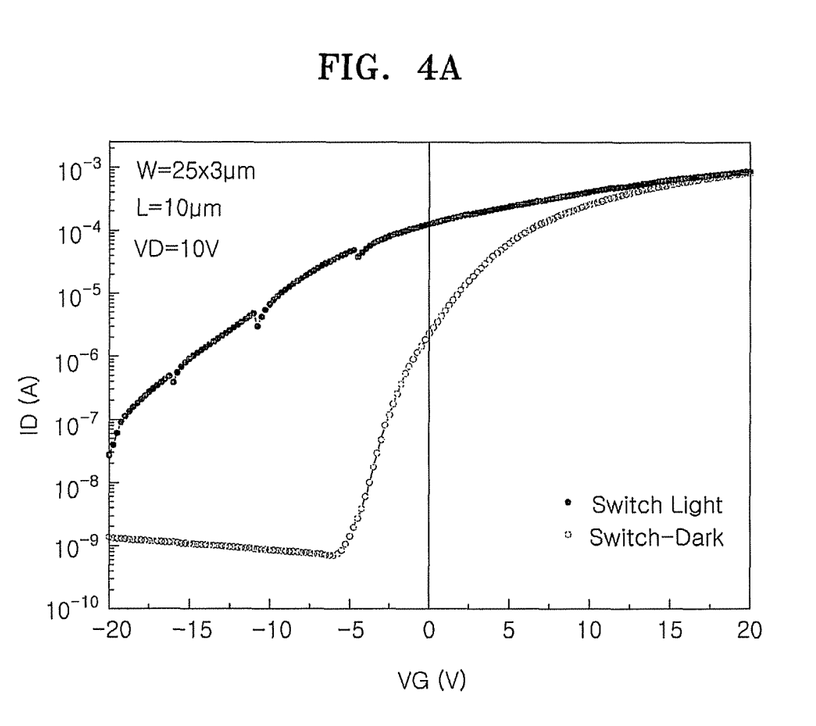
FIG. 4A is a graph illustrating operation characteristics of a light sensor transistor in the light sensing circuit unit manufactured by using the method of FIGS. 3A through 3G.
Figure 4B:
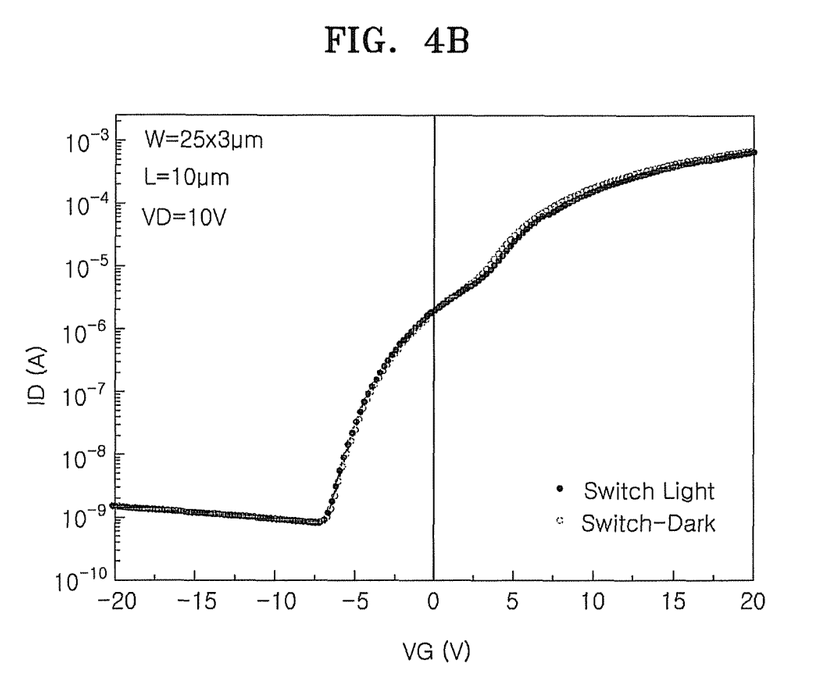
FIG. 4B is a graph illustrating operation characteristics of a switch transistor of the light sensing circuit unit manufactured by using the method of FIGS. 3A through 3G.

FIGS. 4A and 4B are graphs illustrating operation characteristics of the light sensor TFT 14 and the switch TFT 13 in the light sensing circuit unit 10s formed by the above-described method of FIGS. 3A through 3G.

Referring to FIG. 4A, in the case of the light sensor TFT 14, a drain current ID when light is applied (Sensor Light) is much higher than a drain current ID when no light is applied (Sensor Dark). In particular, when a gate voltage VG is about a threshold voltage (about −5 V in the graph of FIG. 4A), a drain current ID is greatly changed (to have a high current ratio), and as the gate voltage VG increases, the current ratio decreases.

Referring to FIG. 4B, since the second channel film 107 is covered by the light shielding film 114, the switch TFT 13 shows constant operation characteristics irrespective of whether light is applied.

Considering the above-described characteristics of the switch TFT 13 and the light sensor TFT 14, a method by which the light sensing circuit unit 10s shown in FIG. 2 senses whether light is incident will be explained. First, during an idle state in which data is not output, a LOW voltage is applied to the first gate line GATE1 so that the second switch TFT 13 is in an OFF state. Here, the LOW voltage may be, for example, a voltage lower than a threshold voltage of the second switch TFT 13. Accordingly, during this time, even though light is applied to the light sensor TFT 14, since the second switch TFT 13 in the OFF state, the data line DATA remains in a LOW state. That is, a current rarely flows or a low current flows through the data line DATA.

On the other hand, when data is output, the second switch TFT 13 is turned on by applying a High voltage to the gate of the second switch TFT 13 through the first gate line GATE1. At the same time, a LOW voltage is applied through the second gate line GATE2 to the gate of the light sensor TFT 14. Here, the LOW voltage may be a threshold voltage of the light sensor TFT 14. In this state, if no light is applied to the light sensor TFT 14, a current rarely flows or a low current flows from the light sensor TFT 14 to the data line DATA through the second switch TFT 13. However, if light is applied to the light sensor TFT 14, an OFF current of the light sensor TFT 14 is increased, and a current flowing to the data line DATA is increased. As an intensity of light applied to the light sensor TFT 14 increases, a current flowing to the data line DATA increases. Accordingly, the light sensing circuit unit 10s may output an electrical signal corresponding to an intensity of incident light to the data line DATA.

In FIGS. 1 and 2, the light sensing circuit unit 10s is integrally formed with the display pixel unit 10d. However, the light sensing circuit unit 10s may be separated from the display pixel unit 10d, and a separate optical touch panel may be configured to include only the light sensing circuit unit 10s. In this case, the separate optical touch panel including only the light sensing circuit unit 10s may be attached to a separate display panel including only the display pixel unit 10d. In this case, each of a substrate 101 and a gate insulating film 104 may be formed of a transparent insulating material. Also, each of first and second gate electrodes 102 and 103 and first through third source/drain electrodes 108, 109, and 110 may be formed of a transparent conductive material such as indium tin oxide (ITO).

Figure 5:
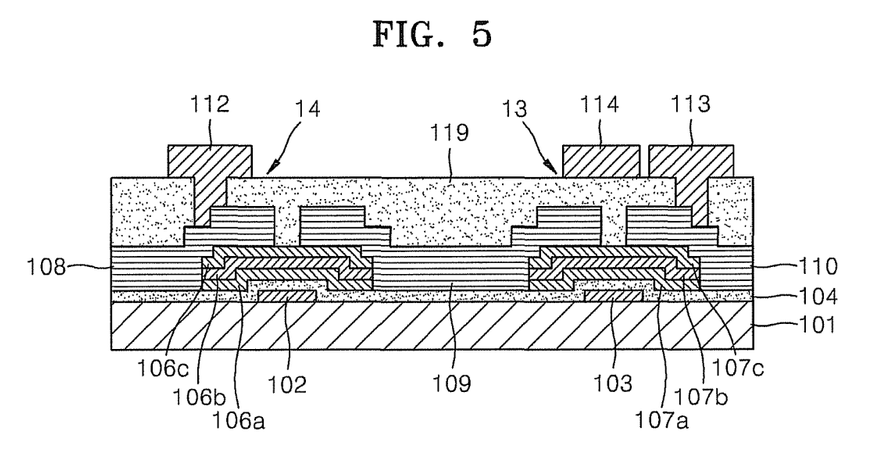
FIG. 5 is a cross-sectional view illustrating a structure of a light sensing circuit unit according to example embodiments.

FIG. 5 is a cross-sectional view illustrating a structure of a light sensing circuit unit according to example embodiments. In FIG. 3G, each of the channel films 106 and 107 is formed as a single layer. However, each of the channel films 106 and 107 may be formed to have a multi-layer structure including a plurality of layers. For example, referring to FIG. 5, each of the channel films 106 and 107 may have a 3-layer structure in which lower channel films 106a and 107a, central channel films 106b and 107b, and upper channel films 106c and 107c are respectively stacked.

For example, each of the central channel films 106b and 107b may be formed of ZnO, InO, SnO, InZnO, ZnSnO, or InSnO having a highest sensitivity to light from among these materials. Each of the lower channel films 106a and 107a is a threshold voltage adjustment layer for preventing or retarding a threshold voltage of the transistor from decreasing too much due to the material of each of the central channel films 106b and 107b. For example, each of the lower channel films 106a and 107a may be formed of XZnO, XInO, XSnO, XInZnO, XZnSnO, or XInSnO (where X is at least one of Hf, Zr, Ti, Ta, Ga, Nb, V, Al, Ga, and Sn). A threshold voltage of the transistor may be adjusted to be close to 0 V according to a material and a thickness of each of the lower channel films 106a and 107a. Each of the upper channel films 106c and 107c may act as a protective film for protecting each of the central channel films 106b and 107b. For example, while the first through third source/drain electrodes 108, 109, and 110 are formed, each of the upper channel films 106c and 107c may act as an etch stopping film. Also, each of the upper channel films 106c and 107c may act as a passivation film for preventing each of the central channel films 106b and 107b from being deformed due to an external material after the light sensing circuit unit is completed. In the alternative, each of the upper channel films 106c and 107c may act as a passivation film for reducing a deformation of each of the central channel films 106b and 107b due to an external material after the light sensing circuit unit is completed. Each of the upper channel films 106c and 107c may be formed of, for example, MZnO, MInO, MSnO, MInZnO, MZnSnO, or MInSnO (where M is at least one of Hf, Zr, Ti, Ta, Ga, Nb, V, Al, Ga, and Sn). In example embodiments, a material of each of the lower channel films 106a and 107b and a material of each of the upper channel films 106c and 107c may be equal to or different from each other.

Figure 6:
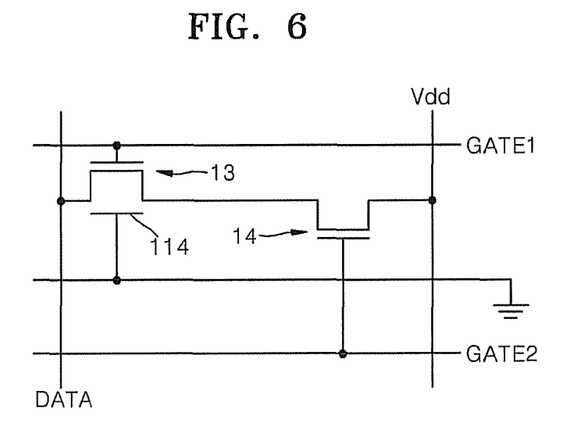
FIG. 6 is a circuit diagram illustrating a structure of a light sensing circuit unit according to example embodiments.

FIG. 6 is a circuit diagram illustrating a structure of a light sensing circuit unit according to example embodiments. Referring to FIG. 6, the light shielding film 114 shown in FIGS. 3G and 5 may be grounded through a wire. In this case, due to charges accumulated in the light shielding film 114, damage or obstruction of the switch TFT 13 due to an external impact may be prevented or reduced.

As described above, since the light sensing circuit unit 10s according to example embodiments includes one switch TFT 13 and one light sensor TFT 14 on the same substrate, a structure of the light sensing circuit unit 10s is simplified. In particular, since the light sensor TFT 14 includes an oxide semiconductor transistor having a relatively high sensitivity to light, an additional capacitor for accumulating charges generated due to light incident on the light sensing circuit unit 10s is not required. Accordingly, if the light sensing circuit unit 10s according to example embodiments is used in an optical touch panel or an image acquisition apparatus, for example, an image pickup device, the optical touch panel or the image acquisition apparatus may be made thinner and larger. For example, an optical touch panel or an image acquisition apparatus may be realized by arranging in a 2D array a plurality of the light sensing circuit units 10s. In example embodiments, as a control and driving apparatus for controlling operations of the light sensing circuit units 10s, an existing control and driving apparatus of the optical touch panel or the image acquisition apparatus may be used.

The optical touch panel including the light sensing circuit unit 10s may be realized as an in-cell type optical touch panel in which the light sensing circuit unit 10s is integrated in the display pixel 10, or an optical touch panel separated from a display device. The optical touch panel separated from the display device may be attached to a surface of the display device. Also, the light sensing circuit unit 10s according to example embodiments may be applied to an image acquisition apparatus, instead of a complementary metal oxide semiconductor (CMOS) or a charge coupled device (CCD).

Figure 7:
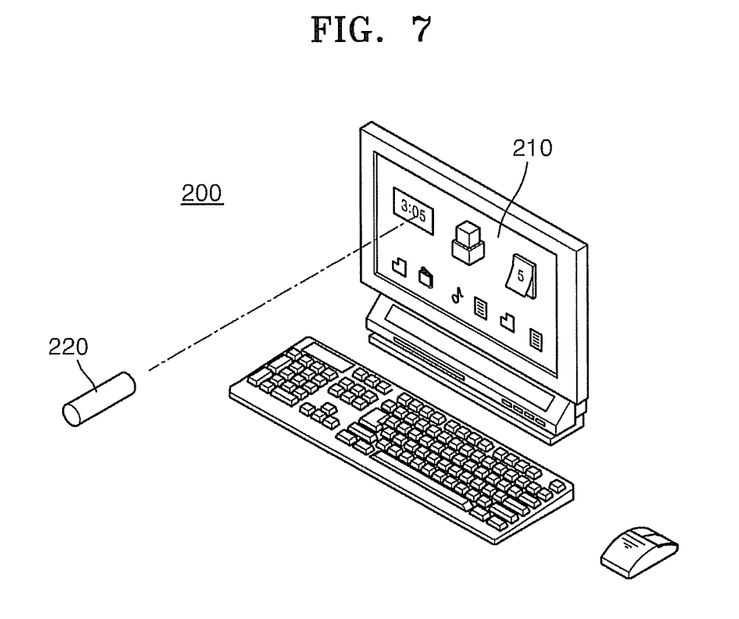
FIG. 7 is a conceptual view illustrating an example where a display device is remotely controlled by a light source device by using an optical touch panel, according to example embodiments.

FIG. 7 is a conceptual view illustrating an example where a display device 210 is remotely controlled by a simple light source device 220 by using an optical touch panel including the light sensing circuit unit 10s. Referring to FIG. 7, an optical touch screen system 200 including the display device 210 is illustrated. The display device 210 may be a device in which an optical touch panel is integrated in a display pixel as an in-cell type, or may be a device in which an optical touch panel is attached to a surface of the display device 210. In the optical touch screen system 200, if light is emitted to the display device 210 by using the simple light source device 220, for example, a laser pointer, the light sensor TFT 14 arranged in the optical touch panel senses light. Accordingly, the same effect as touching a touch screen with a hand or a pen may be achieved.

To assist the understanding of the present invention, example embodiments of a light sensing circuit using an oxide semiconductor transistor, a method of manufacturing the light sensing circuit, and an optical touch panel including the light sensing circuit have been described and attached drawings have been explained. However, it should be understood that example embodiments described herein should be considered in a descriptive sense only and not for purposes of limitation. Descriptions of features or aspects within example embodiments should typically be considered as available for other similar features or aspects in other embodiments.

What is claimed is:
1. A light sensing circuit comprising:
a substrate;
a display cell;
a first switch transistor for turning on or off the display cell;
a light sensor transistor on the substrate, the light sensor transistor being configured to sense light;
a second switch transistor on the substrate, the second switch transistor being configured to output data from the light sensor transistor;
a light shielding film on a light incident surface of the second switch transistor, the light shielding film being configured to substantially block light from being incident on the second switch transistor;
a first gate line connected to gates of the first and second switch transistors;
a second gate line connected to a gate of the light sensor transistor;
a driving voltage line connected to a drain of the light sensor transistor; and
a data line connected to a source of the second switch transistor,
wherein a drain of the second switch transistor is connected to a source of the light sensor transistor, and the light sensing circuit does not include a capacitor to accumulate carriers generated by light.

2. The light sensing circuit of claim 1, wherein the light sensor transistor and the second switch transistor each include an oxide semiconductor material for a channel film.

3. The light sensing circuit of claim 2, wherein the oxide semiconductor materials included in the light sensor transistor and the second switch transistor are the same.

4. The light sensing circuit of claim 2, wherein the oxide semiconductor material includes an oxide semiconductor material having at least one of ZnO, InO, SnO, InZnO, ZnSnO, or InSnO, or an oxide semiconductor material comprising at least one of hafnium (Hf), zirconium (Zr), titanium (Ti), tantalum (Ta), gallium (Ga), niobium (Nb), vanadium (V), aluminum (Al), gallium (Ga), and tin (Sn) in addition to ZnO, InO, SnO, InZnO, ZnSnO, and InSnO.

5. The light sensing circuit of claim 1, further comprising:
a gate insulating film on the substrate; and
a transparent insulating layer on the gate insulating film, wherein
the light sensor transistor includes a first gate electrode on the substrate, a first channel film on the first gate electrode, and a first source/drain electrode on one side of the first channel film, the first channel film including an oxide semiconductor material,
the second switch transistor includes a second gate electrode on the substrate, a second channel film on the second gate electrode, a second source/drain electrode on one side of the second channel film, and a third source/drain electrode on another side of the second channel film, the third source/drain electrode being between the first and second channel films and electrically connecting the second switch transistor to the light sensor transistor, the second channel film including an oxide semiconductor material,
the gate insulating film covers at least a portion of the first and second gate electrodes, and
the transparent insulating layer covers the first, second, and third source/drain electrodes and the first and second channel films.

6. The light sensing circuit of claim 5, wherein the oxide semiconductor materials include an oxide semiconductor material having at least one of ZnO, InO, SnO, InZnO, ZnSnO, and InSnO, or an oxide semiconductor material comprising at least one of Hf, Zr, Ti, Ta, Ga, Nb, V, Al, Ga, and Sn in addition to ZnO, InO, SnO, InZnO, ZnSnO, and InSnO.

7. The light sensing circuit of claim 5, wherein the third source electrode electrically connects the first and second channel films.

8. The light sensing circuit of claim 5, wherein
the light sensor transistor further includes a first wire having a portion passing through the transparent insulating film and connecting to the first source/drain electrode, and
the second switch transistor further includes a second wire having a portion passing through the transparent insulating layer and connecting to the second source/drain electrode.

9. The light sensing circuit of claim 8, wherein:
the driving voltage line is connected to the first source/drain electrode through the first wire; and
the data line is connected to the second source/drain electrode through the second wire.

10. The light sensing circuit of claim 5, wherein the light shielding film is on the transparent insulating film and covers the second channel film.

11. The light sensing circuit of claim 5, wherein the first and second channel films have a 3-layer structure comprising a lower channel film, a central channel film on the lower channel film, and an upper channel film on the central channel film.

12. The light sensing circuit of claim 11, wherein the central channel film includes at least one of ZnO, InO, SnO, InZnO, ZnSnO, and InSnO, the lower channel film includes at least one of XZnO, XInO, XSnO, XInZnO, XZnSnO, and XInSnO (where X is at least one of Hf, Zr, Ti, Ta, Ga, Nb, V, Al, Ga, and Sn), and the upper channel film includes at least one of MZnO, MInO, MSnO, MInZnO, MZnSnO, or MInSnO (where M is at least one of Hf, Zr, Ti, Ta, Ga, Nb, V, Al, Ga, and Sn).

13. The light sensing circuit of claim 1, wherein the light shielding film is grounded.

14. The light sensing circuit of claim 1, wherein the light shielding film is a metal material thicker than a skin depth.

15. An optical touch panel comprising:
at least one light sensing circuit of claim 1.

16. An image acquisition apparatus comprising at least one light sensing circuit of claim 1.

17. A method of manufacturing a light sensing circuit, the method comprising:
forming first and second gate electrodes on a substrate;
forming a gate insulating film on the substrate and the first and second gate electrodes;
forming first and second channel films on the gate insulating film to respectively face the first and second gate electrodes;
forming source/drain electrodes on both sides of the first channel film and both sides of the second channel film;
forming a transparent insulating film on the source/drain electrodes and the first and second channel films; and
forming a light shielding film on the transparent insulating film to cover the second channel film,
wherein the first and second channel films are formed of a same oxide semiconductor material,
wherein the source/drain electrodes comprise:
a first source/drain electrode that is formed to cover a first side surface of the first channel film;
a second source/drain electrode that is formed to cover a second side surface of the first channel film, a first side surface of the second channel film, and a portion of the gate insulating film between the first channel film and the second channel film; and
a third source/drain electrode that is formed to cover a second side surface of the second channel film,
wherein the first gate electrode is connected to a first gate line, the second gate electrode is connected to a second gate line, the first source/drain electrode is connected to a driving voltage line, the third source/drain electrode is connected to a data line, and the light sensing circuit does not include a capacitor to accumulate carriers generated by light; and
wherein the light sensing circuit further comprises:
a display cell; and
a switch transistor for turning on or off the display cell, a gate of the switch transistor being connected to the first gate line.

18. The method of claim 17, wherein the oxide semiconductor material is an oxide semiconductor material including at least one of ZnO, InO, SnO, InZnO, ZnSnO, or InSnO, or an oxide semiconductor material including at least one of Hf, Zr, Ti, Ta, Ga, Nb, V, Al, Ga, and Sn in addition to ZnO, InO, SnO, InZnO, ZnSnO, or InSnO.

19. The method of claim 17, wherein the light shielding film is formed of a metal material that is thicker than a skin depth.

20. The method of claim 17, further comprising:
forming a first via hole by etching the transparent insulating film to partially expose the first source/drain electrode;
forming a second via hole by etching the transparent insulating film to partially expose the third source/drain electrode; and
forming a first wire electrically connected to the first source/drain electrode, and a second wire electrically connected to the third source/drain electrode, by filling the first and second via holes with a conductive material.

21. The method of claim 20, wherein the light shielding film and the first and second wires are simultaneously formed and are formed of the same material.

22. The method of claim 17, wherein forming the first and second channel films comprises:
- forming first and second lower channel films on the gate insulating film to respectively face the first and second gate electrodes;
- respectively forming first and second central channel films on the first and second lower channel films; and
- respectively forming first and second upper channel films on the first and second central channel films.

23. The method of claim 22, wherein each of the first and second central channel films includes at least one of ZnO, InO, SnO, InZnO, ZnSnO, and InSnO,
- each of the first and second lower channel films includes at least one of XZnO, XInO, XSnO, XInZnO, XZnSnO, and XInSnO (where X is at least one of Hf, Zr, Ti, Ta, Ga, Nb, V, Al, Ga, and Sn), and
- each of the first and second upper channel films includes at least one of MZnO, MInO, MSnO, MInZnO, MZnSnO, and MInSnO (where M is at least one of Hf, Zr, Ti, Ta, Ga, Nb, V, Al, Ga, and Sn).

* * * * *